United States Patent
Chow

(10) Patent No.: US 12,382,928 B2
(45) Date of Patent: Aug. 12, 2025

(54) PET TOY

(71) Applicant: DAKA INTERNATIONAL LIMITED, Hong Kong (CN)

(72) Inventor: Jesse Chow, Hong Kong (CN)

(73) Assignee: DAKA INTERNATIONAL LIMITED, Hong Kong (CN)

( * ) Notice: Subject to any disclaimer, the term of this patent is extended or adjusted under 35 U.S.C. 154(b) by 28 days.

(21) Appl. No.: 18/487,414

(22) Filed: Oct. 16, 2023

(65) Prior Publication Data
US 2024/0164347 A1  May 23, 2024

(30) Foreign Application Priority Data

Nov. 19, 2022 (CN) .......................... 202211450048.3

(51) Int. Cl.
*A01K 15/02* (2006.01)

(52) U.S. Cl.
CPC .................. *A01K 15/025* (2013.01)

(58) Field of Classification Search
CPC .............................. A01K 15/025; A63H 33/26
USPC ........................................ 446/484, 486, 490
See application file for complete search history.

(56) References Cited

U.S. PATENT DOCUMENTS 4,627,620 A * 12/1986 Yang .................. A63B 69/0028
482/84

FOREIGN PATENT DOCUMENTS

CN 213819385 U 7/2021

* cited by examiner

*Primary Examiner* — Kimberly S Berona
*Assistant Examiner* — Nevena Aleksic
(74) *Attorney, Agent, or Firm* — JEEN IP LAW, LLC

(57) ABSTRACT

The present invention relates to the technical field of pet toys, in particular to pet toys for teasing cats and other pets. It comprises a jacking component, a power component, a toy base pad and a deformable connecting wire, wherein the jacking component comprises a reset structure, a rocker base and a rocker member hinged with the rocker base; the rocker member comprises a driven end, and there is a connecting wire actuating arm from the connecting wire to the axis of the hinged joint between the rocker member and the rocker base, where the moment generated by the connecting wire actuating arm causes the rocker member to move away from the rocker base. The present invention can form a prominent protrusion from the rocker base back and forth, thereby attracting the attention of cats and other pets, and teasing cats, etc.

17 Claims, 15 Drawing Sheets

PET TOY

CROSS-REFERENCE TO RELATED APPLICATIONS

This is a U.S. patent application which claims the priority and benefit of Chinese Patent Application Number 202211450048.3, filed on Nov. 19, 2022, the disclosure of which is incorporated herein by reference in its entirety.

TECHNICAL FIELD

The present invention relates to the technical field of pet toys, in particular to pet toys for teasing cats and other pets.

BACKGROUND

CN213819385U discloses a camouflaged mouse cat teasing toy, comprising a main body, which comprises an upper cover, an inner cover and a bottom cover in sequence from the top down. The inner ring of the inner cover is provided with toothed grains, the bottom cover is provided with a motor and also with gears, the gears are matched with the toothed grains, and the inner cover is rotated by clicking to realize the cat teasing function. The side of the bottom cover is provided with a plurality of second rollers, and a plurality of first rollers are provided above the bottom cover, so that the inner cover rotates more smoothly; there are a plurality of rubber foot pads on the bottom of the bottom cover to prevent slipping and swinging during operation. Both ends of the inner cover are provided with a cat teasing rod and a feather connecting rod. The combination of the feather and silicone cat teasing accessories makes the present invention more practical in catering for preferences of different pets compared to products with a single function only in the market, solving the problem of functional singularity of products effectively.

In summary, at least the following technical problems exist in the prior art:

Firstly, currently, there is no toy in the market that can form a prominent protrusion from the ground to tease cats and other pets through this prominent protrusion.

SUMMARY

One objective of the present invention is to solve or alleviate the above first technical problem.

The measure taken by the present invention is a pet toy, which comprises a jacking component, a power component, a toy base pad and a deformable connecting wire, wherein the jacking component comprises a reset structure, a rocker base and a rocker member hinged with the rocker base; the rocker member comprises a driven end, and there is a connecting wire actuating arm from the connecting wire to the axis of the hinged joint between the rocker member and the rocker base, where the moment generated by the connecting wire actuating arm causes the rocker member to move away from the rocker base; the reset structure is connected to the rocker member and the rocker base, respectively, so that the driven end has a tendency of approaching the rocker base; the power component comprises a sliding end that can drive the connecting wire to move; the two ends of the connecting wire are a pulling end connected to the driven end and a sliding end connected to the sliding member, respectively.

The effect realized by the present invention is to form a prominent protrusion from the rocker base back and forth, thereby attracting the attention of cats and other pets, and teasing cats, etc.

A further technical solution, further comprising a sheet-shaped toy base pad, a rocker base fixed to the front side of the toy base pad, and a power component fixedly connected to the toy base pad, thereby making the pet toy look like a pad in general for easy use and storage.

A further technical solution, further comprising a covering layer fixed to the front side of the toy base pad, where the connecting wire passes between the covering layer and the toy base pad, so that the connecting wire is not exposed and the reliability of its movement is ensured.

A further technical solution, wherein the reset structure is an elastic sheet fixedly connected to the rocker base, and is integrally connected to the covering layer, thereby facilitating the mass production of the pet toy.

A further technical solution, wherein the power component further comprises a rotating base and a rotating member provided with a bracing part; the rotating member is hinged with the rotating base and has rotational power, and the sliding member is slidably connected to the rotating base, which has a radial vector; when the rotating member rotates, the bracing part braces the sliding member and keeps the sliding member away from the axis of the rotating member.

A further technical solution, wherein there are a plurality of jacking components, connecting wires and sliding members.

A further technical solution, wherein the sliding members are linearly slidably connected to the rotating base; all linear sliding connections between the sliding members and the rotating base point to the axis of the rotating member, so that a plurality of rocker members can be driven by a single power source, thereby simplifying the structure and reducing the cost.

A further technical solution, wherein when viewed from above, the power component is located completely in the toy base pad and among the jacking components.

A further technical solution, wherein when viewed from above, the connecting wires and the rocker members of all jacking components pass through the axis of the rotating member, thereby ensuring that the pulling force of the connecting wires is in the same direction as the sliding direction of the sliding member and that the connecting wires move smoothly.

A further technical solution, wherein all jacking components and sliding members are distributed uniformly around the axis of the rotating member.

A further technical solution, wherein the rotating base is provided with a plurality of connecting wire ports, which are located on one side of the rotating member, and the connecting wires pass through the connecting wire ports, respectively, thereby allowing the power component to be provided on the edge of the toy base pad and utilizing the toy base pad to a great extent.

A further technical solution, wherein the maximum distance between two jacking components is the maximum distance among the jacking components, the maximum distance between two connecting wire ports is the maximum distance among the connecting wire ports, and the maximum distance among the connecting wire ports is less than the maximum distance among the jacking components, thereby allowing the power component to be connected to part of the edge of the toy base pad only, and further utilizing the toy base to a great extent.

A further technical solution, wherein the rotating base is provided with a steering body, and the connecting wires bypass the steering body respectively to form a before-wheel segment and a steering segment; the steering segment is closer to the sliding member relative to the before-wheel segment, and the connecting wires between the connecting wire ports and the corresponding steering body are parallel to one another, thereby avoiding interference among the connecting wires and ensuring the smooth movement of the connecting wires.

A further technical solution, wherein a rotatable steering wheel fits over the steering body, and the connecting wires bypass the steering wheel, respectively, thereby avoiding interference among the connecting wires and ensuring the smooth movement of the connecting wires.

A further technical solution, wherein the rotating base is fixedly provided with a protective body, which is used to prevent the connecting wires from approaching the steering body, thereby ensuring that the connecting wires move smoothly without being interfered with by one another.

A further technical solution, wherein the reset structure is an elastic sheet fixedly connected to the rocker base, and the rocker member is located between the rocker base and the reset structure.

A further technical solution, wherein all edges of the reset structure are connected to the rocker base, and in a closed shape when viewed from above.

A further technical solution, wherein the rocker base comprises a base sidewall, the rocker member is below or flush with the base sidewall when laid flat, and the reset structure is pressed against the top of the base sidewall.

A further technical solution, wherein the rocker member comprises a hinged end provided with a hinged shaft, the rocker base comprises a protrusion for hinging provided with a hinged groove, and the hinged shaft is inserted into the hinged groove.

A further technical solution, wherein the rocker base is provided with a penetration port, and when viewed from above, there is an overlap between the hinged end and the penetration port, and the hinged groove is provided with an exposed port, and the hinged shaft can move upward and out of the exposed port.

In summary, the present invention can realize the following technical effects:
1) It can form a prominent protrusion from the rocker base back and forth, thereby attracting the attention of cats and other pets, and teasing cats, etc.
2) It can make the pet toy look like a pad in general for easy use and storage.
3) It can further utilize the toy base pad to a great extent.

Figure 1:
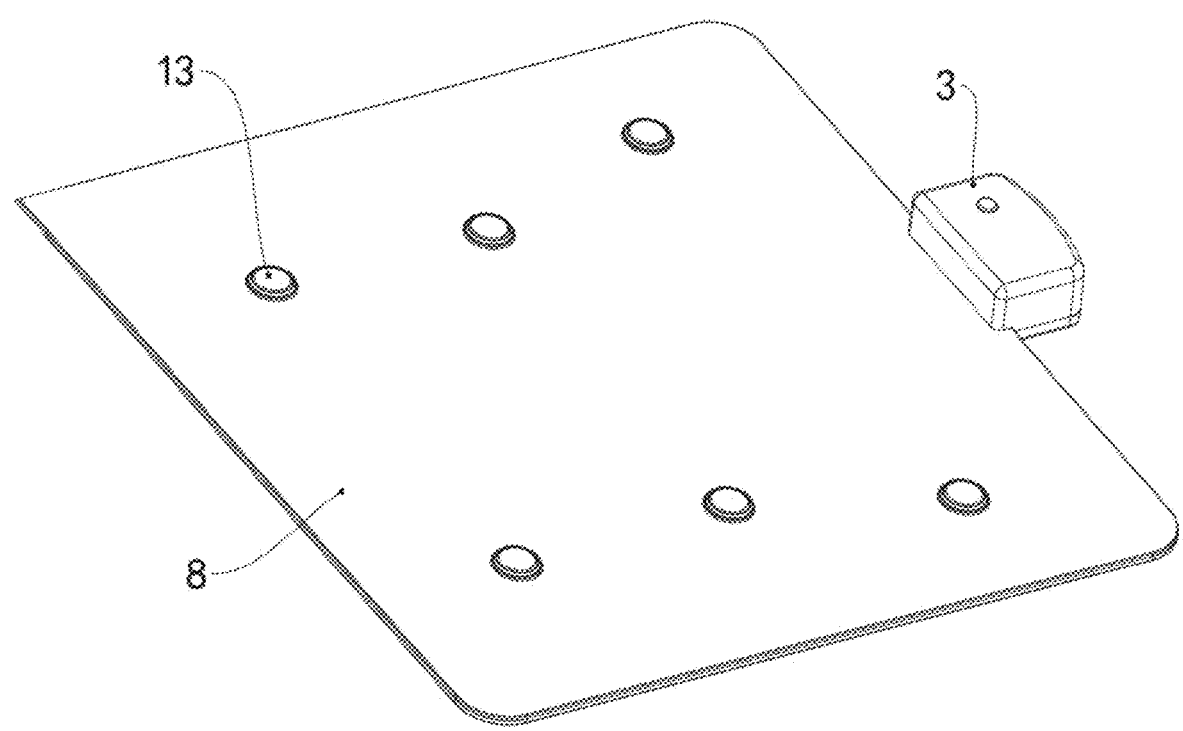
FIG. 1 is a three-dimensional schematic diagram of the pet toy in an embodiment of the present invention.
Figure 2:
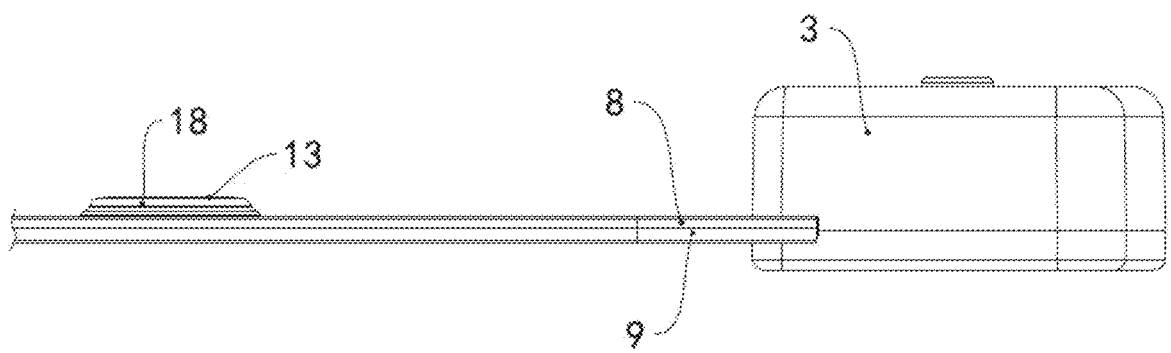
FIG. 2 is a side view of the pet toy in an embodiment of the present invention.

Section 1; Arrow 1; Arrow 2; Arrow 3; Arrow 4; Line 1; jacking component 1; rocker member 11; driven end 111; pulling end connecting hole 112; large diameter end holding groove 113; hinged end 116; hinged shaft 117; threading hole 118; wire step-down port 119; rocker base 12; penetration port 124; protrusion for hinging 125; hinged groove 126; exposed port 127; base sidewall 128; extension tube seat 129; reset structure 13; maximum distance among the jacking components 15; fixed frame 18; fixed frame protrusion 189; extension tube 19; connecting wire 2; pulling end 21; sliding end 22; height difference segment 23; before-wheel segment 24; steering segment 25; connecting wire actuating arm 29; power component 3; rotating member 31; bracing part 311; rotating member gear 312; motor 313; worm 314; sliding member 32; sliding end connecting hole 329; rotating base 33; connecting wire port 331; steering body 332; steering wheel 333; protective body 334; maximum distance among the connecting wire ports 335; upper base 338; lower base 339; sliding structure 37; sliding groove 371; sliding block 372; electric control device 38; power source 381; switch 382; shell 39; covering layer 8; toy base pad 9.

DETAILED DESCRIPTION

Specific embodiments of the present invention will be described below by reference to the drawings for the specification.

As a specific embodiment, the pet toy in an embodiment of the present invention comprises a lifting structure of pet toys and a driving structure of pet toys.

The lifting structure of the pet toy in an embodiment of the present invention comprises a jacking component 1, wherein the jacking component 1 comprises a reset structure 13, a rocker base 12 and a rocker member 11 hinged with the rocker base 12.

The rocker member 11 comprises a driven end 111, and there is a connecting wire actuating arm 29 from the connecting wire 2 to the axis of the hinged joint between the rocker member 11 and the rocker base 12, where the moment generated by the connecting wire actuating arm 29 causes the rocker member 11 to move away from the rocker base 12.

Figure 16:
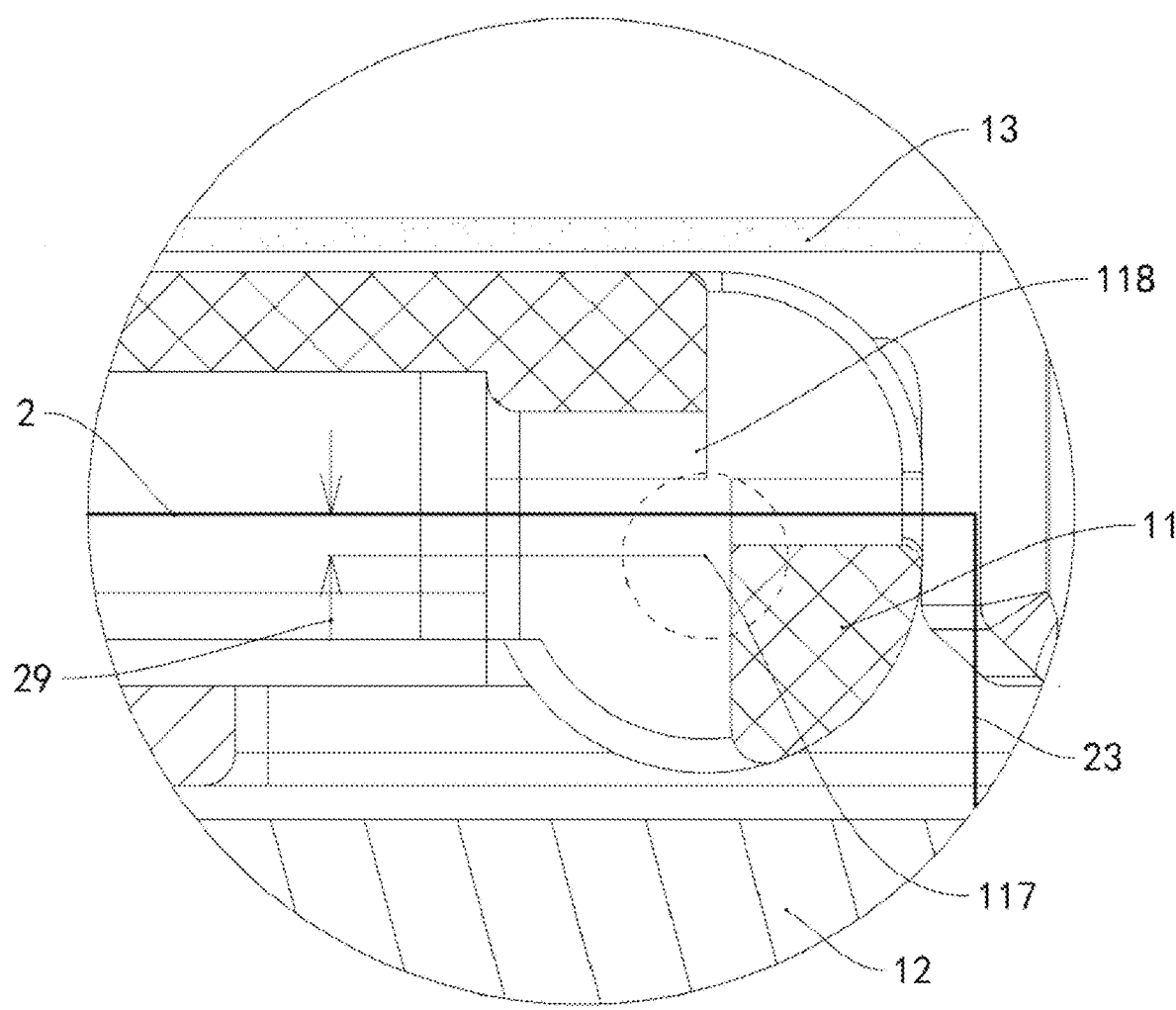
FIG. 16 is an enlarged schematic diagram of DTL1 in FIG. 9.

The reset structure 13 is connected to the rocker member 11 and the rocker base 12, respectively, so that the driven end 111 has a tendency of approaching the rocker base 12. For example, the reset structure 13 is a spring, and its two ends are connected to the rocker member 11 and the rocker base 12 through hooks, respectively, and the pulling force provided by the reset structure 13 causes the driven end 111 to have a tendency of approaching the rocker base 12 (FIG. 16).

Figure 9:
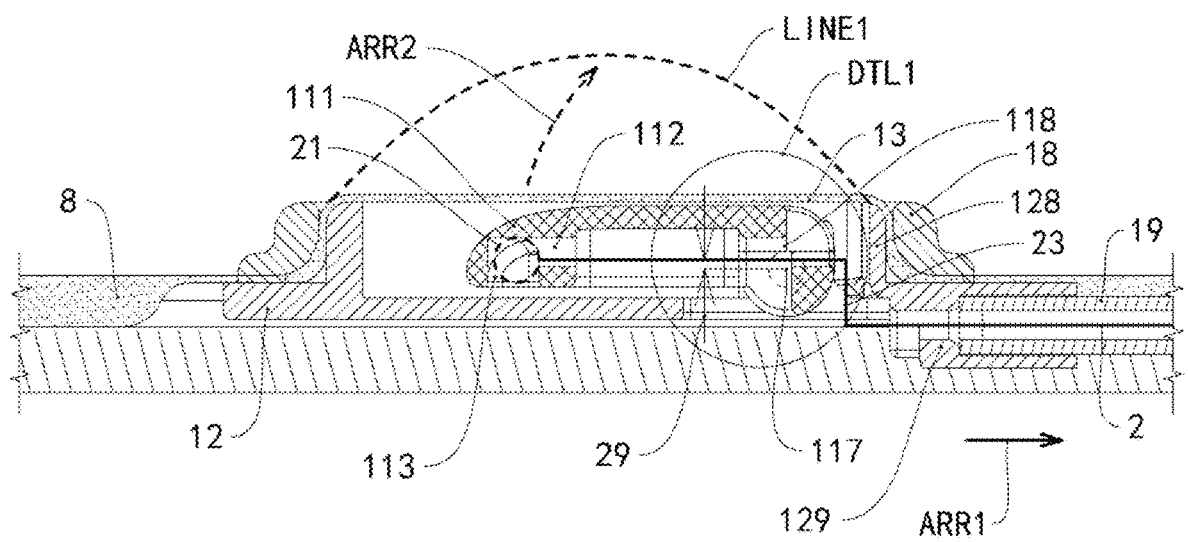
FIG. 9 is a schematic diagram of Section 1; Arrow 1 indicates the direction in which the power component 3 pulls the connecting wire 2 when the reset structure 13 is to be jacked up; Arrow 2 indicates the direction in which the pulling end 21 drives the rocker member 11 to rotate when the reset structure 13 is to be jacked up; Line 1 denotes the hypothetical position of the reset structure 13 after being jacked up by the driven end 111.
Figure 10:
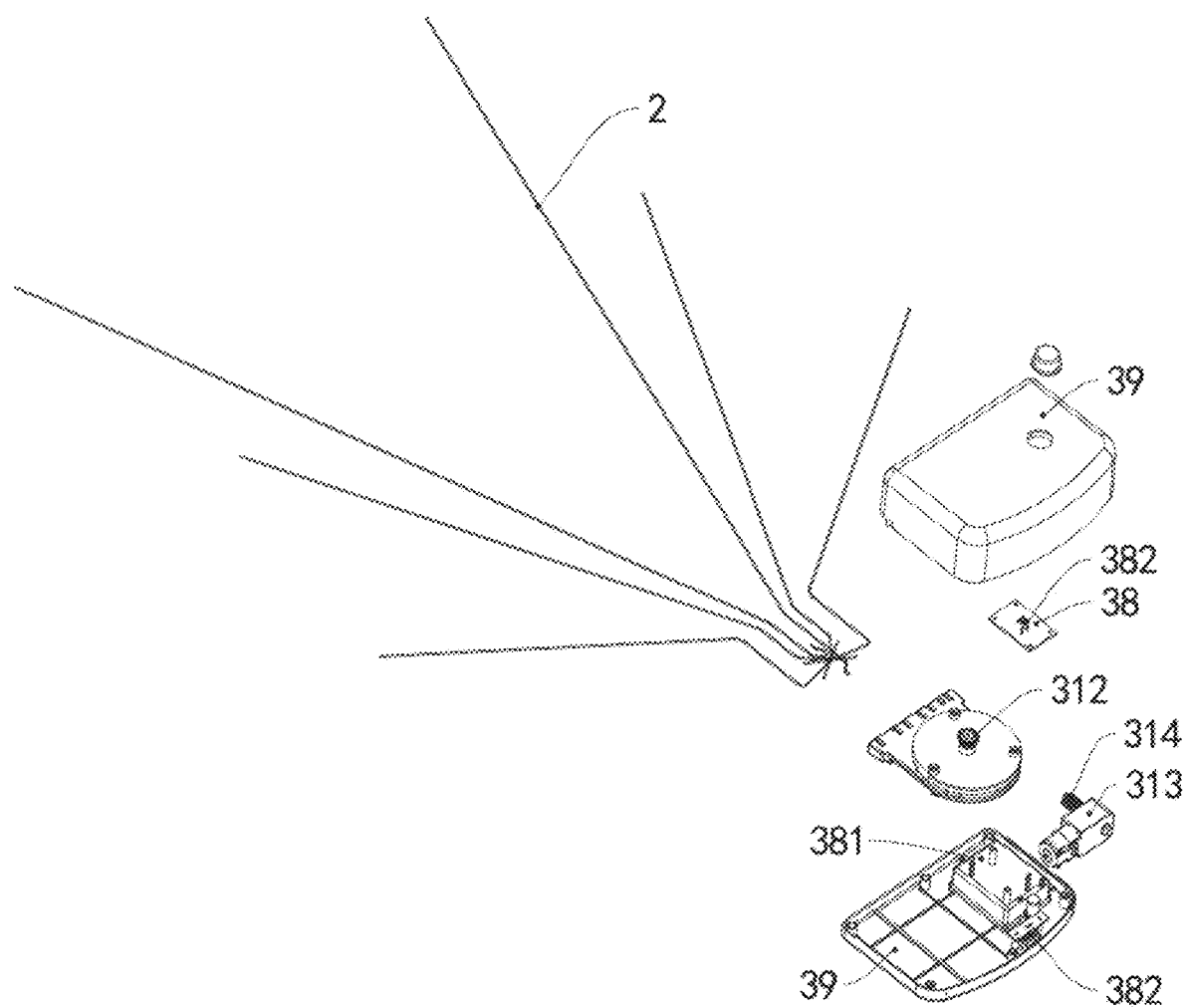
FIG. 10 is a three-dimensional exploded view of exploded state 1 of the power component 3 in an embodiment of the present invention.
Figure 11:
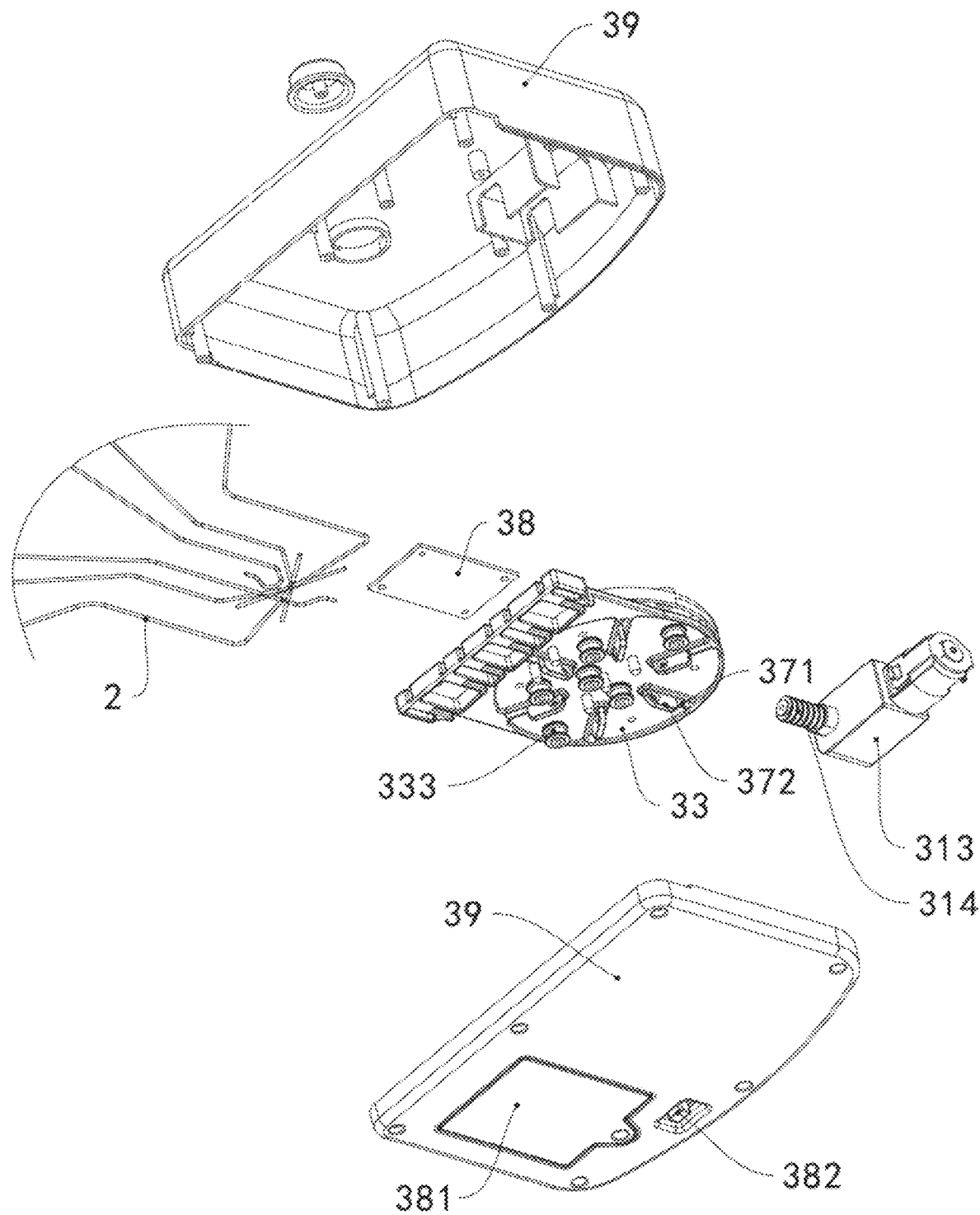
FIG. 11 is another three-dimensional exploded view of exploded state 1 of the power component 3 in an embodiment of the present invention.
Figure 12:
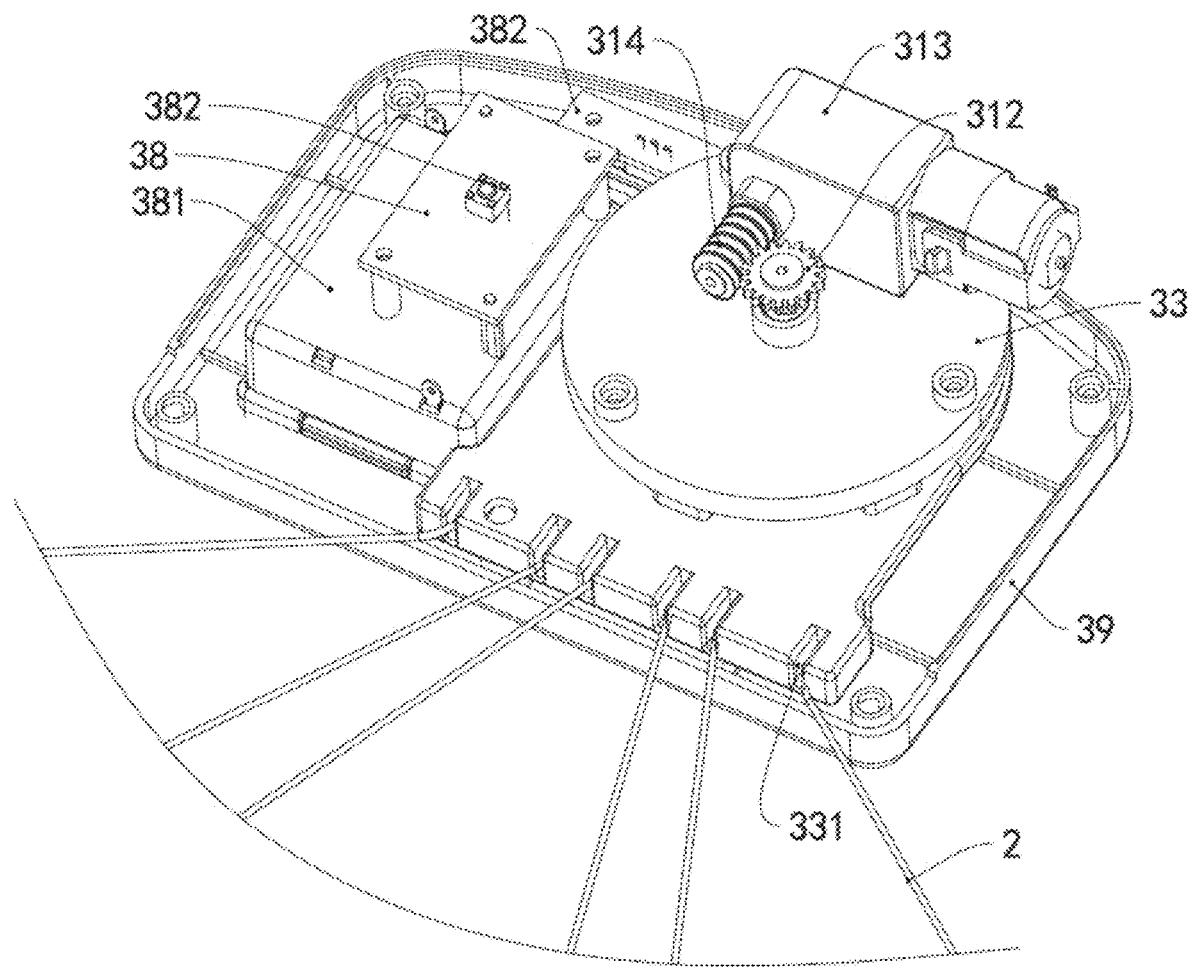
FIG. 12 is a three-dimensional schematic diagram of the power component 3 of an embodiment of the present invention; the upper cover of the shell 39 is not shown.
Figure 13:
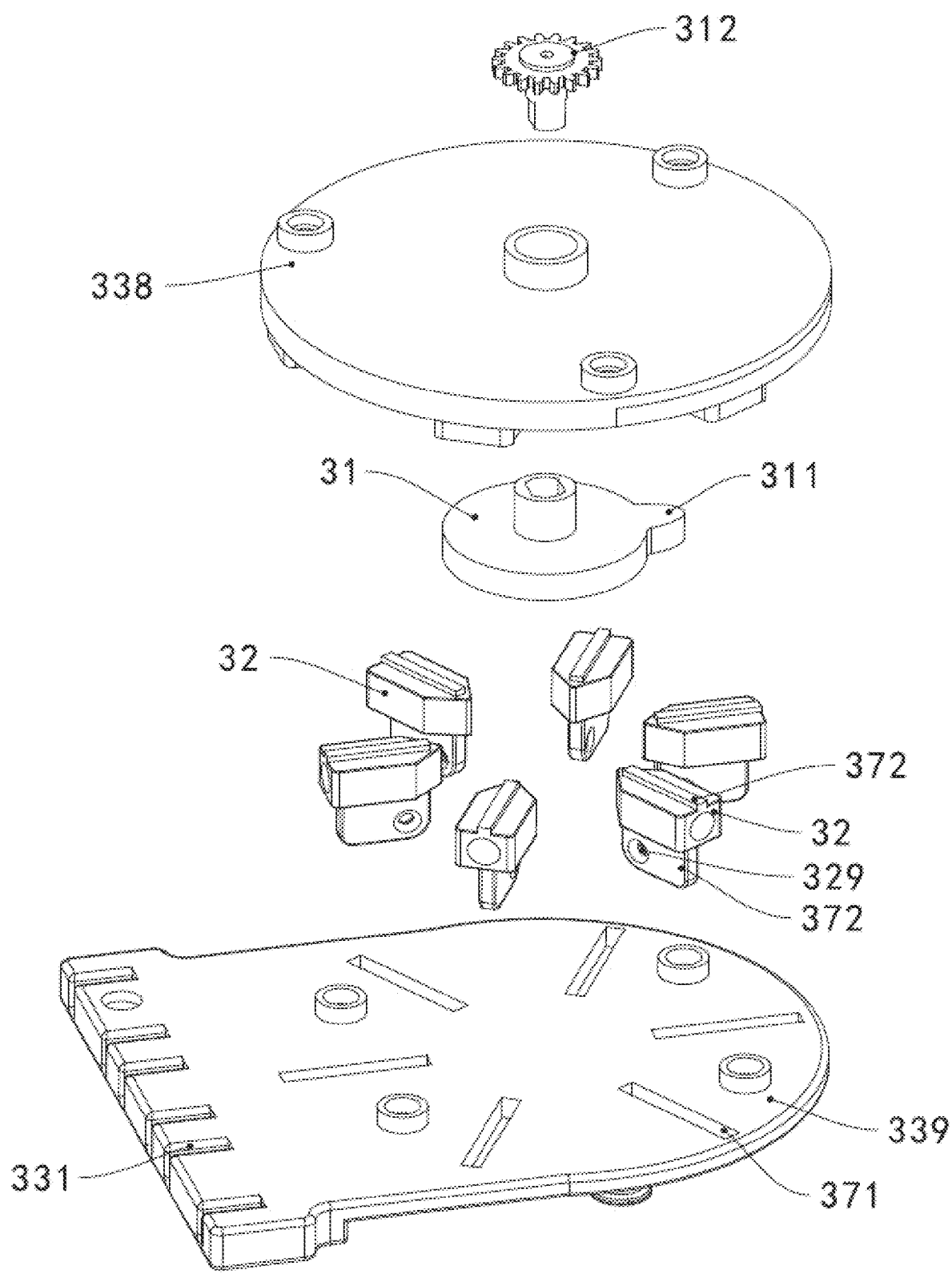
FIG. 13 is a three-dimensional exploded view of exploded state 2 of the power component 3 in an embodiment of the present invention; the shell 39 and the connecting wire 2 are not shown.
Figure 14:
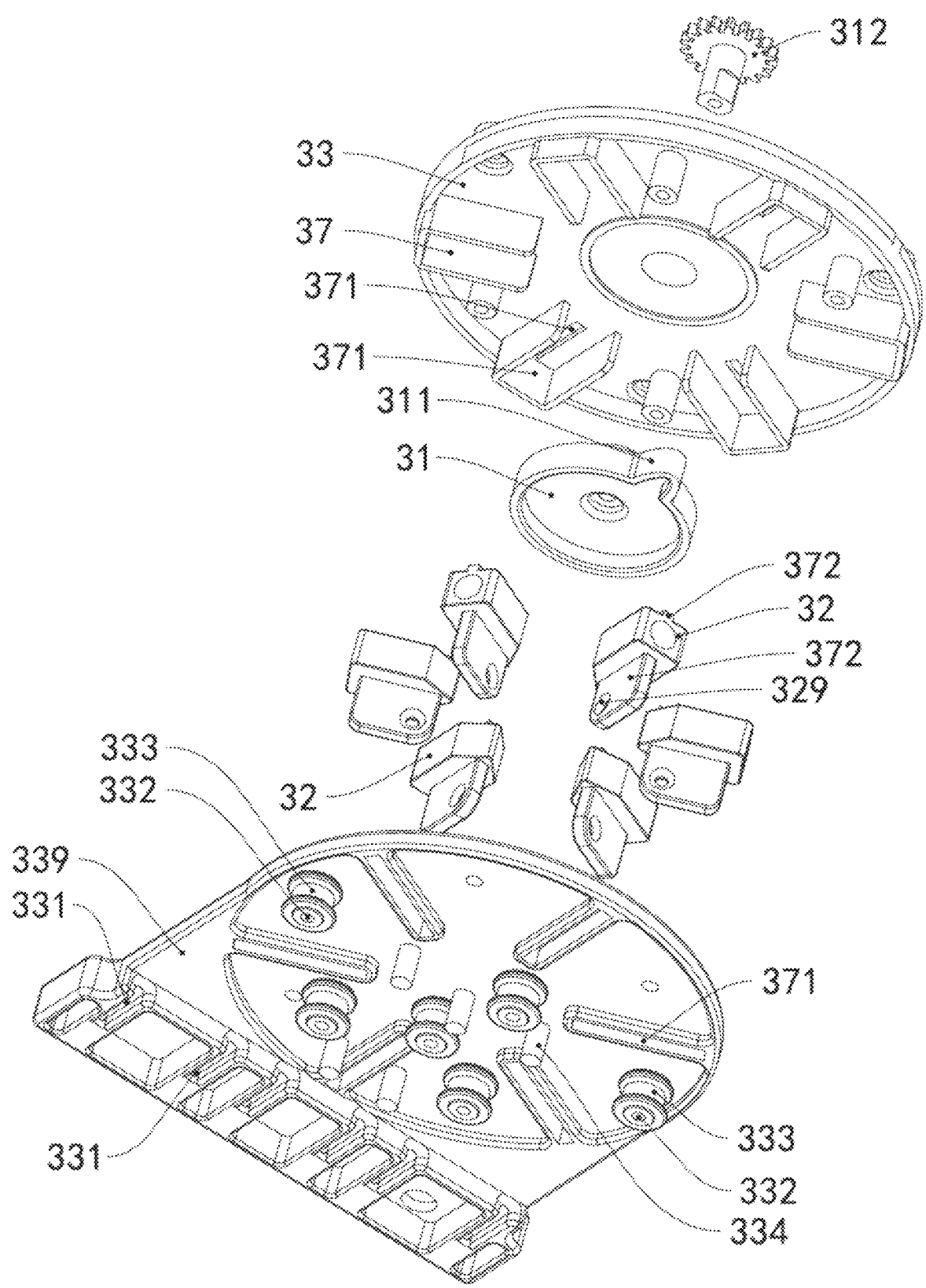
FIG. 14 is another three-dimensional exploded view of exploded state 2 of the power component 3 in an embodiment of the present invention; the shell 39 and the connecting wire 2 are not shown.

The operating principle is as follows: As shown in FIG. 9, when the connecting wire 2 is driven by the power component 3 described below and retracted into the power component 3, the driven end 111 is pulled by the connecting wire 2, causing the driven end 111 to rotate and move away from the rocker base 12, and protrude prominently from the rocker base 12, thereby attracting the attention of cats and other pets, and inducing them to press the protruding driven end 111.

The connecting wire 2 is released by the power component 3, and the reset structure 13 causes the driven end 111 to approach the rocker base 12 rotatably until it is pressed against or close to the rocker base 12 and laid flat; at the same time, the driven end 111 drives the connecting wire 2 to reset.

It can be seen from above that a prominent protrusion can be formed from the rocker base 12 back and forth, thereby attracting the attention of cats and other pets, and realizing cat teasing, etc.

As one of the specific embodiments, the reset structure 13 is an elastic sheet fixedly connected to the rocker base 12, and the rocker member 11 is located between the rocker base 12 and the reset structure 13. For example, the reset structure 13 is an elastic rubber sheet. It should be noted that when there is a gap between the reset structure 13 and the rocker member 11, the reset structure 13 is connected indirectly to the rocker member 11.

As one of the specific embodiments, all edges of the reset structure 13 are connected to the rocker base 12, and in a closed shape when viewed from above, such as circular, square or rectangular. When the driven end 111 jacks up the sheet-shaped reset structure 13, the reset structure 13 can be bulged (i.e. the cross-section is curved), thereby improving the effect of attracting the attention of cats and other pets.

As one of the specific embodiments, the rocker base 12 comprises a base sidewall 128, the rocker member 11 is below or flush with the base sidewall 128 when laid flat, and the reset structure 13 is pressed against the top of the base sidewall 128. For example, the base sidewall 128 is cylindrical in general, and when the rocker member 11 is laid flat, the reset structure 13 has a roughly flat portion other than a slightly protruding bulge, thereby making the bulging effect of the reset structure 13 more prominent.

As one of the specific embodiments, the jacking component 1 also comprises a fixed frame 18, which is detachably and fixedly connected to the rocker base 12, and the fixed frame 18 and the rocker base 12 clamp the reset structure 13, so that the reset structure 13 is fixedly connected to the rocker base 12, making it easy to fix the reset structure 13. For example, the fixed frame 18 and the base sidewall 128 hold the reset structure 13.

As one of the specific embodiments, the fixed frame 18 is provided with a fixed frame protrusion 189 embedded directly or indirectly into the rocker base 12, making the fixed frame 18 detachably and fixedly connected to the rocker base 12. For example, the fixed frame protrusion 189 is directly embedded into the rocker base 12 through the reset structure 13, presses against the reset structure 13 or is embedded indirectly into the rocker base 12 through the reset structure 13, making it easy to fix the reset structure 13.

As one of the specific embodiments, the rocker member 11 comprises a hinged end 116 provided with a hinged shaft 117, the rocker base 12 comprises a protrusion for hinging 125 provided with a hinged groove 126, and the hinged shaft 117 is inserted into the hinged groove 126, so that the rocker member 11 is hinged with the rocker base 12.

As one of the specific embodiments, the rocker base 12 comprises an extension tube seat 129, the hinged end 116 is provided with a threading hole 118, and the inner cavity of the extension tube seat 129 is lower than the threading hole 118. The connecting wire 2 passes through the wire hole 118 and the inner cavity of the extension tube seat 129 in sequence to form a height difference segment 23. When the connecting wire 2 is retracted into the power component 3, the pulling force of the height difference segment 23 generates a moment, causing the driven end 111 to rotate and move away from the rocker base 12, thereby improving the effect of the connecting wire 2 driving the driven end 111 to rotate.

As one of the specific embodiments, the connecting wire 2 also comprises an extension tube 19, which is detachably connected to the extension tube seat 129, so that the inner cavity of the extension tube 19 and the inner cavity of the extension tube seat 129 are on a straight line and connected. For example, the extension tube 19 is embedded into the extension tube seat 129, making the extension tube 19 detachably connected to the extension tube seat 129.

As one of the specific embodiments, the rocker base 12 is provided with a penetration port 124. When viewed from above as shown in FIG. 9, there is an overlap between the hinge end 116 and the penetration port 124. The hinged groove 126 is provided with an exposed port 127, and the hinged shaft 117 can move upward (vertically or obliquely upward) to move out of the exposed port 127. The hinged shaft 117 can be moved out of the hinged groove 126, and the connecting wire 2 can pass through the extension tube seat 129 and the penetration port 124 in sequence, and then through the threading hole 118 of the rocker member 11 separated from the rocker base 12, thereby facilitating the assembly of the jacking component 1, and also ensuring that the hinged shaft 117 is located in the hinged groove 126 when the connecting wire 2 pulls the rocker member 11 with high reliability.

As one of the specific embodiments, the driven end 111 is provided with a pulling end connecting hole 112, and the connection wire 2 comprises a pulling end 21, which passes through the pulling end connecting hole 112 from the hinge end 116 (which ignores the physical obstruction of the driven end 111) and presses against the driven end 111, so that the pulling end 21 is connected to the driven end 111.

For example, the pulling end 21 is a spherical or cylindrical object with a diameter greater than the pulling end connecting hole 112, or a ball-like object formed by knotting, making it impossible for the pulling end 21 to pass through the pulling end connecting hole 112. The connection between the pulling end 21 and the driven end 111 is unidirectional; in other words, the pulling end 21 can freely move from the hinged end 116 to the driven end 111, but the movement from the driven end 111 to the hinged end 116 is restricted by the pulling end connecting hole 112, thereby ensuring that when the connecting wire 2 extends, the rocker member 11 is laid flat and fits with the rocker base 12.

As one of the specific embodiments, the driven end 111 is provided with a large diameter end holding groove 113 connected to the pulling end connecting hole 112, and the pulling end 21 is located in the large diameter end holding groove 113.

The driving structure of the pet toy in an embodiment of the present invention comprises a power component 3, which comprises a rotating base 33, a sliding member 32 and a rotating member 31 provided with a bracing part 311.

The rotating member 31 is hinged with the rotating base 33 and has rotational power, and the axis of hinging between the rotating member 31 and the rotating base 33 is referred to as the axis of the rotating member 31.

The sliding member 32 is slidably connected to the rotating base 33, which has a radial vector; in other words, in this sliding connection, there is a difference between the distance from the end closer to the axis of the rotating member 31 to the axis of the rotating member 31, and the distance from the end farther away from the axis of the rotating member 31 to the axis of the rotating member 31.

When the rotating member 31 rotates, the bracing part 311 braces the sliding member 32 and keeps the sliding member 32 away from the axis of the rotating member 31.

The sliding member 32 comprises a portion for connecting the connecting wire 2, and the sliding member 32 has a tendency of approaching the axis of the rotating member 31. For example, the sliding member 32 is provided with a sliding end connecting hole 329, and after the connecting wire 2 passes through the sliding end connecting hole 329, the sliding member 32 is connected to the connecting wire 2 by knotting or connecting the pulling end 21 as mentioned above. For another example, the sliding member 32 has a tendency of approaching the axis of the rotating member 31 through a spring.

As mentioned above, the connecting wire 2 applies a force on the rocker member 11 due to the reset structure 13, so that the rocker member 11 pulls the sliding member 32, realizing the tendency of the connecting wire 2 to bring the sliding member 32 close to the axis of the rotating member 31.

The operating principle is as follows: When the rotating member 31 rotates, the bracing part 311 presses against the sliding member 32, causing the sliding member 32 to move away from the axis of the rotating member 31. The sliding member 32 pulls the connecting wire 2, which is driven by the power component 3 and retracted into the power component 3, forming a prominent protrusion from the rocker base 12 as mentioned above, thereby attracting the attention of cats and other pets, and realizing cat teasing, etc.

When the bracing part 311 rotates and passes over the sliding member 32, the connecting wire 2 applies a force on the rocker member 11, so that the rocker member 11 pulls the sliding member 32 to reset, and the connecting wire 2 is released by the power component 3.

By rotating the rotating member 31 multiple turns in a single direction, the connecting wire 2 can move back and forth without the need for a complex structure.

It can be seen from above that a simple structure can provide power for the connecting wire 2 to move back and forth.

As one of the specific embodiments, the power component 3 also comprises a motor 313 and a rotating member gear 312 fixedly connected to the rotating member 31, and the motor 313 drives the rotating member gear 312 to rotate, thereby providing rotational power to the rotating member 31.

As one of the specific embodiments, the motor 313 is fixed on the rotating base 33, and the output end of the motor 313 is fixedly provided with a worm 314 engaged with the rotating member gear 312. The engaging structure of the rotating member gear 312 and the worm 314 has a self-locking effect, and the sliding of the sliding member 32 cannot make the motor 313 rotate, thereby ensuring that the bulging effect of the above reset structure 13 is relatively stable.

As one of the specific embodiments, the motor 313 is fixed on the rotating base 33, and drives the rotating member gear 312 to rotate in both directions. In other words, the motor 313 can drive the rotating member gear 12 to rotate, and the rotating member gear 312 can also drive the rotating output end of the rotating member gear 312 to rotate. For example, the output end of the motor 313 is fixedly provided with a gear engaged with the rotating member gear 312, which discharges the worm 314. The sliding of the sliding element 32 can rotate the motor 313; when the rocker member 11 and the connecting wire 2 are stepped on accidentally, so that the sliding member 32 moves, the sliding member 32 presses against the bracing part 311, causing the rotating member gear 312 to rotate without causing the connecting wire 2 to be stretched, thereby reducing or eliminating the risk of the connecting wire 2 being pulled apart.

As one of the specific embodiments, the power component 3 also comprises an electric control device 38 electrically connected to the motor 313, which is electrically connected to a power source 381 and a switch 382. The electronic control device 38 is a circuit board or the like used to control the speed and/or starting of the motor 313.

As one of the specific embodiments, the sliding members 32 are linearly slidably connected to the rotating base 33.

As one of the specific embodiments, the power component 3 also comprises a sliding structure 37, which comprises a sliding groove 371 and a sliding block 372 embedded into the sliding groove 371; the sliding groove 371 and the sliding block 372 are provided on the rotating base 33 and the sliding member 32, respectively. For example, the top and bottom ends of the sliding element 32 are provided with a sliding block 372, and the rotating base 33 comprises an upper base 338 and a lower base 339, both of which are provided with a sliding groove 371 to ensure the stable sliding of the sliding element 32. Of course, the sliding member 32 can also be embedded into the sliding groove 371 to realize sliding wheel connection. For another example, the top and bottom ends of the sliding member 32 are provided with a sliding groove 371.

As one of the specific embodiments, all linear sliding connections between the sliding members 32 and the rotating base 33 point to the axis of the rotating member 31, and the sliding member 32 are multiple and distributed uniformly around the axis of the rotating member 31, thereby ensuring that the sliding members 32 have a consistent travel, and that the bulging effect of each reset structure 13 is consistent.

As one of the specific embodiments, the power component 3 also comprises a shell 39, and a rotating base 33 is provided in the shell 39.

As a specific embodiment, the pet toy in an embodiment of the present invention comprises a jacking component 1, a power component 3, a toy base pad 9 and a deformable connecting wire 2. For example, the connecting wire 2 is a somewhat flexible steel cable.

The jacking component 1 comprises a reset structure 13, a rocker base 12 and a rocker member 11 hinged with the rocker base 12; the rocker member 11 comprises a driven end 111, and there is a connecting wire actuating arm 29 from the connecting wire 2 to the axis of the hinged joint between the rocker member 11 and the rocker base 12, where the moment generated by the connecting wire actuating arm 29 causes the rocker member 11 to move away from the rocker base 12; the reset structure 13 is connected to the rocker member 11 and the rocker base 12, respectively, so that the driven end 111 has a tendency of approaching the rocker base 12.

The power component 3 comprises a rotating base 33, a sliding member 32 and a rotating member 31 provided with a bracing part 311; the rotating member 31 is hinged with the rotating base 33 and has rotational power, and the sliding member 32 is slidably connected to the rotating base 33, which has a radial vector; when the rotating member 31 rotates, the bracing part 311 braces the sliding member 32 and keeps the sliding member 32 away from the axis of the rotating member 31.

The two ends of the connecting wire 2 are a pulling end 21 connected to the driven end 111 and a sliding end 22 connected to the sliding member 32, respectively.

The pet toy in an embodiment of the present invention can form a prominent protrusion from the rocker base 12 back and forth, thereby attracting the attention of cats and other pets, and realizing cat teasing, etc.

As one of the specific embodiments, the pet toy in an embodiment of the present invention also comprises a sheet-shaped toy base pad 9, a rocker base 12 fixed to the front side of the toy base pad 9, and a power component 3 fixedly connected to the toy base pad 9, such as the edge of the toy base pad 9, thereby making the pet toy look like a pad in general for easy use and storage.

As one of the specific embodiments, the pet toy in an embodiment of the present invention also comprises a covering layer 8 fixed to the front side of the toy base pad 9. For example, the covering layer 8 is fixed by fitting with the toy base pad 9. The connecting wire 2 passes between the covering layer 8 and the toy base pad 9. It can be easily understood that there is a non-sticking portion between the covering layer 8 and the toy base pad 9, which corresponds to the connecting wire 2, thereby preventing the connection wire 2 from being exposed and ensuring the reliability of movement of the connection wire 2.

As one of the specific embodiments, the reset structure 13 is an elastic sheet fixedly connected to the rocker base 12, and is integrally connected to the covering layer 8. A rubber pad or other sheet can form a reset structure 13 and a covering layer 8, thereby facilitating the mass production of the pet toy.

As one of the specific embodiments, there are a plurality of jacking components 1, connecting wires 2 and sliding members 32.

As one of the specific embodiments, the sliding members 32 are linearly slidably connected to the rotating base 33; all linear sliding connections between the sliding members 32 and the rotating base 33 point to the axis of the rotating member 31, so that a plurality of rocker members can be driven by a single power source, thereby simplifying the structure and reducing the cost. For example, as mentioned above, the sliding members 32 are distributed uniformly around the axis of the rotating member 31, so that the rocker members 11 are lifted uniformly. Of course, the sliding members 32 can also be distributed non-uniformly as necessary to realize the uneven lifting of the rocker members 11.

As one of the specific embodiments (not shown in the drawing of this embodiment), when viewed from above, the power component 3 is located completely in the toy base pad 9 and among the jacking components 1. For example, there are two jacking components 1, and when viewed from above, the power component 3 is located between the two jacking components 1, so that when viewed from above, the power component 3 is located completely between the jacking components 1. For example, there are three jacking components 1, which are connected in sequence to form a triangle. When viewed from above, the power component 3 is located completely in this triangle, so that when viewed from above, the power component 3 is located completely between the jacking components 1.

As one of the specific embodiments (not shown in the drawing of this embodiment), when viewed from above, the connecting wire 2 and the rocker member 11 of each jacking component 1 pass through the axis of the rotating member 31. For example, all jacking components 1 and all sliding members 32 are distributed uniformly around the axis of the rotating member 31, thereby ensuring that the pulling force of the connecting wires 2 is in the same direction as the sliding direction of the sliding member 32 and that the connecting wires 2 move smoothly.

Figure 15:
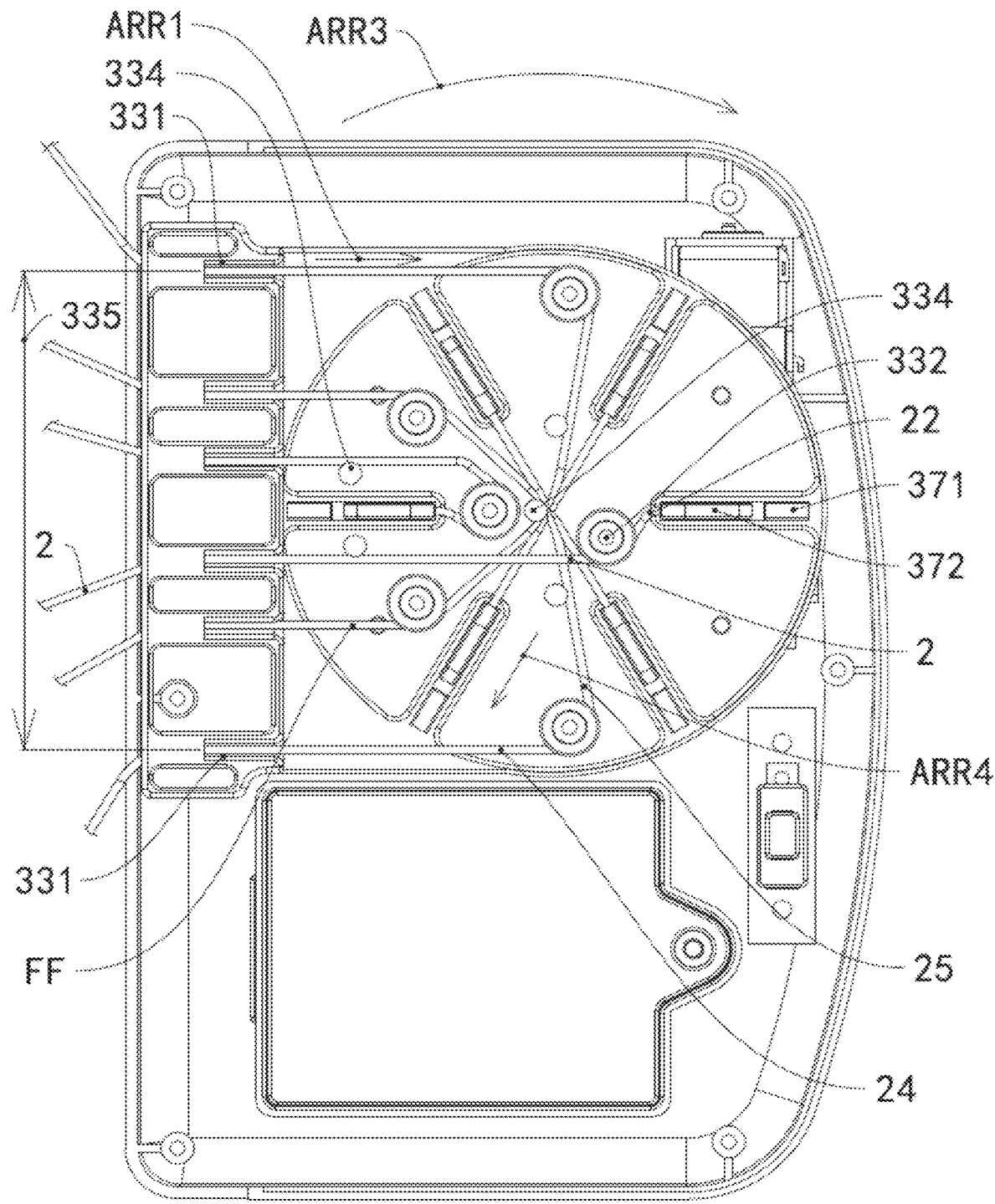
FIG. 15 is an upward view of the power component 3 of an embodiment of the present invention; the bottom cover of the shell 39 is not shown; Arrow 3 denotes the rotating direction of the rotating member 31; Arrow 4 denotes the direction in which sliding member 32 is braced by the bracing part 311 of the rotating member 31, and Arrow 1 denotes the direction in which the sliding member 32 pulls the connecting wire 2 to move it.

As one of the specific embodiments, as shown in FIG. 15, the rotating base 33 is provided with a plurality of connecting wire ports 331, which are located on one side of the rotating member 31, and the connecting wires 2 pass through the connecting wire ports 331, respectively, thereby allowing the power component 3 to be provided on the edge of the toy base pad 9 and utilizing the toy base pad 9 to a great extent, so that pets, etc. are not interfered with by the power component 3 when on the toy base pad 9.

As one of the specific embodiments, the rotating base 33 is provided with a steering body 332, and the connecting wires 2 bypass the steering body 332 respectively to form a before-wheel segment 24 and a steering segment 25; the steering segment 25 is closer to the sliding member 32 relative to the before-wheel segment 24, and the connecting wires 2 between the connecting wire ports 331 and the corresponding steering body 332 are parallel to one another, thereby avoiding interference among the connecting wires 2 and ensuring the smooth movement of the connecting wires 2.

Figure 3:
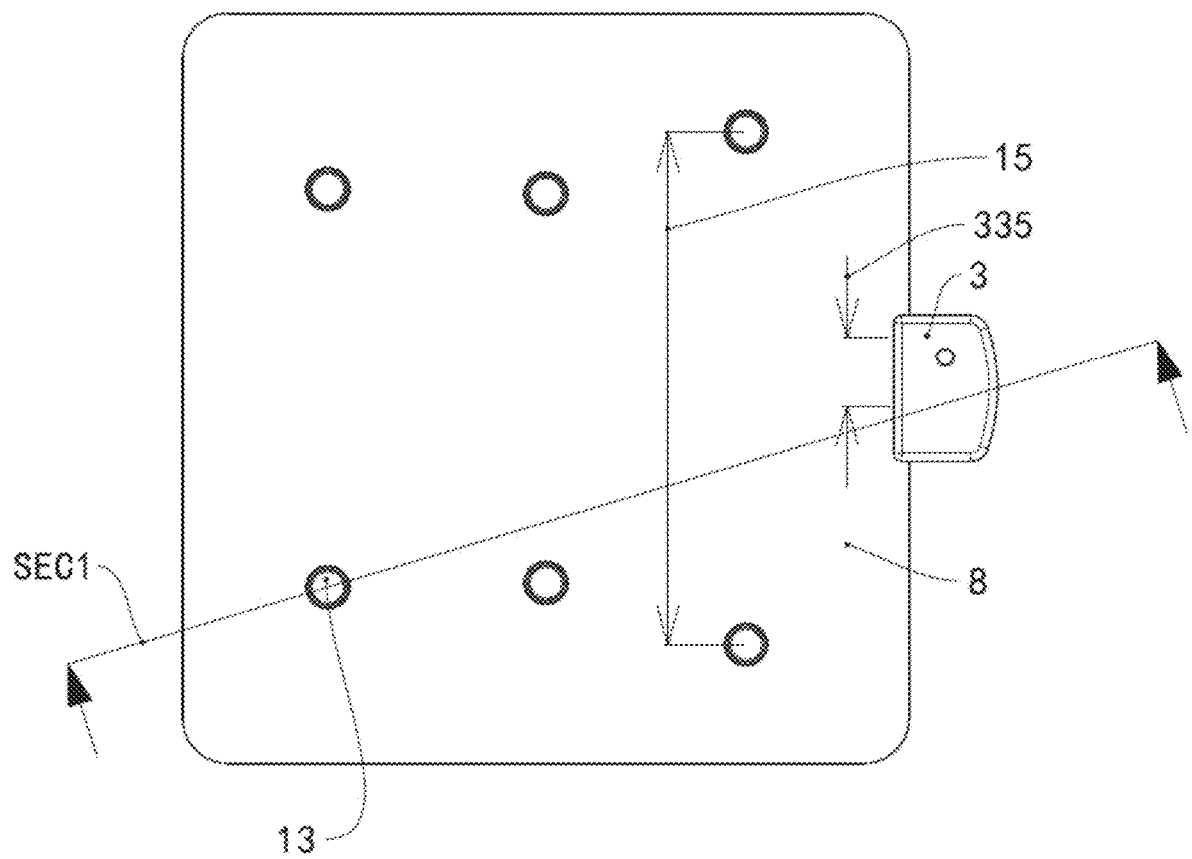
FIG. 3 is a top view of the pet toy in an embodiment of the present invention.
Figure 4:
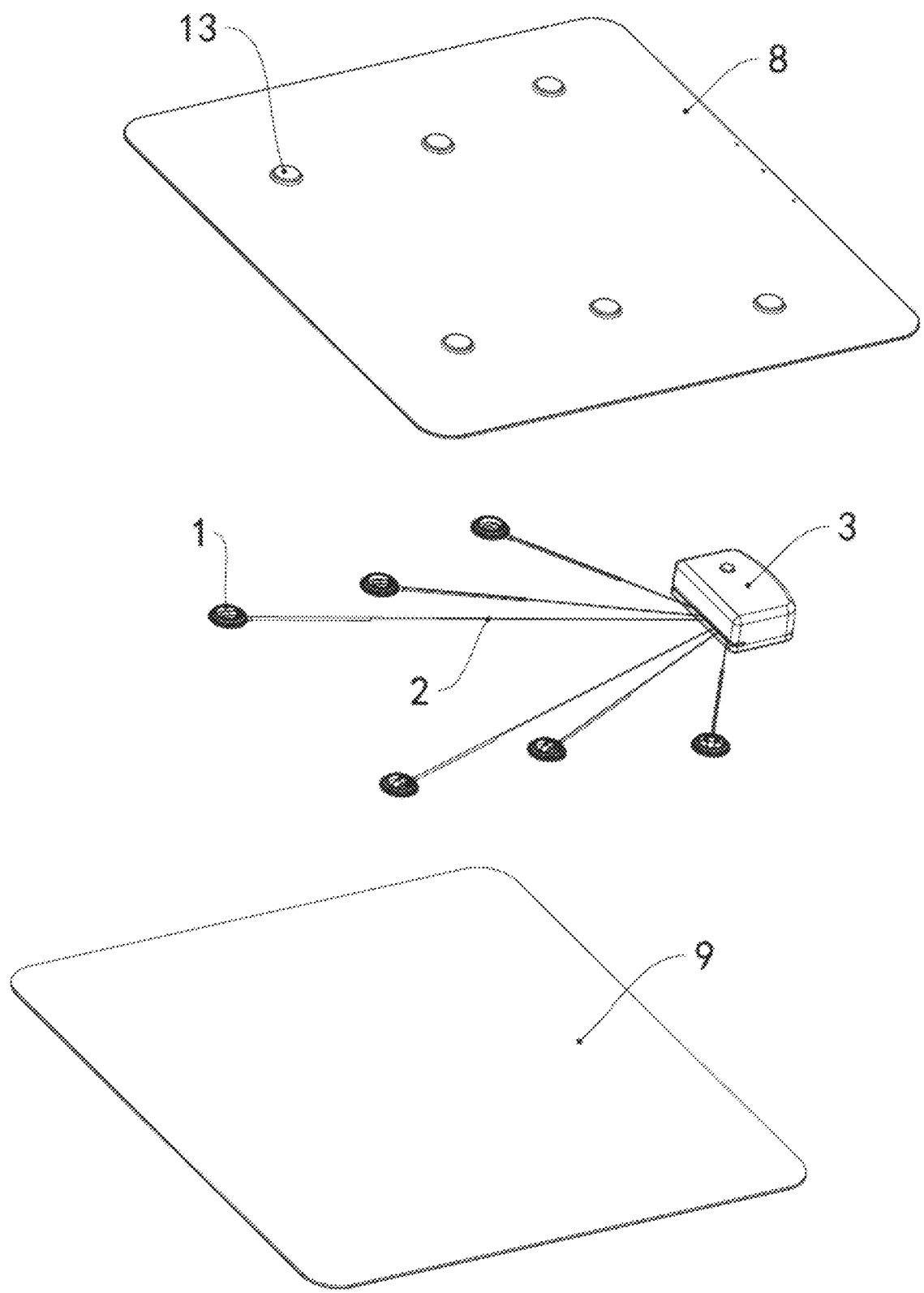
FIG. 4 is a three-dimensional exploded view of the pet toy in an embodiment of the present invention.
Figure 5:
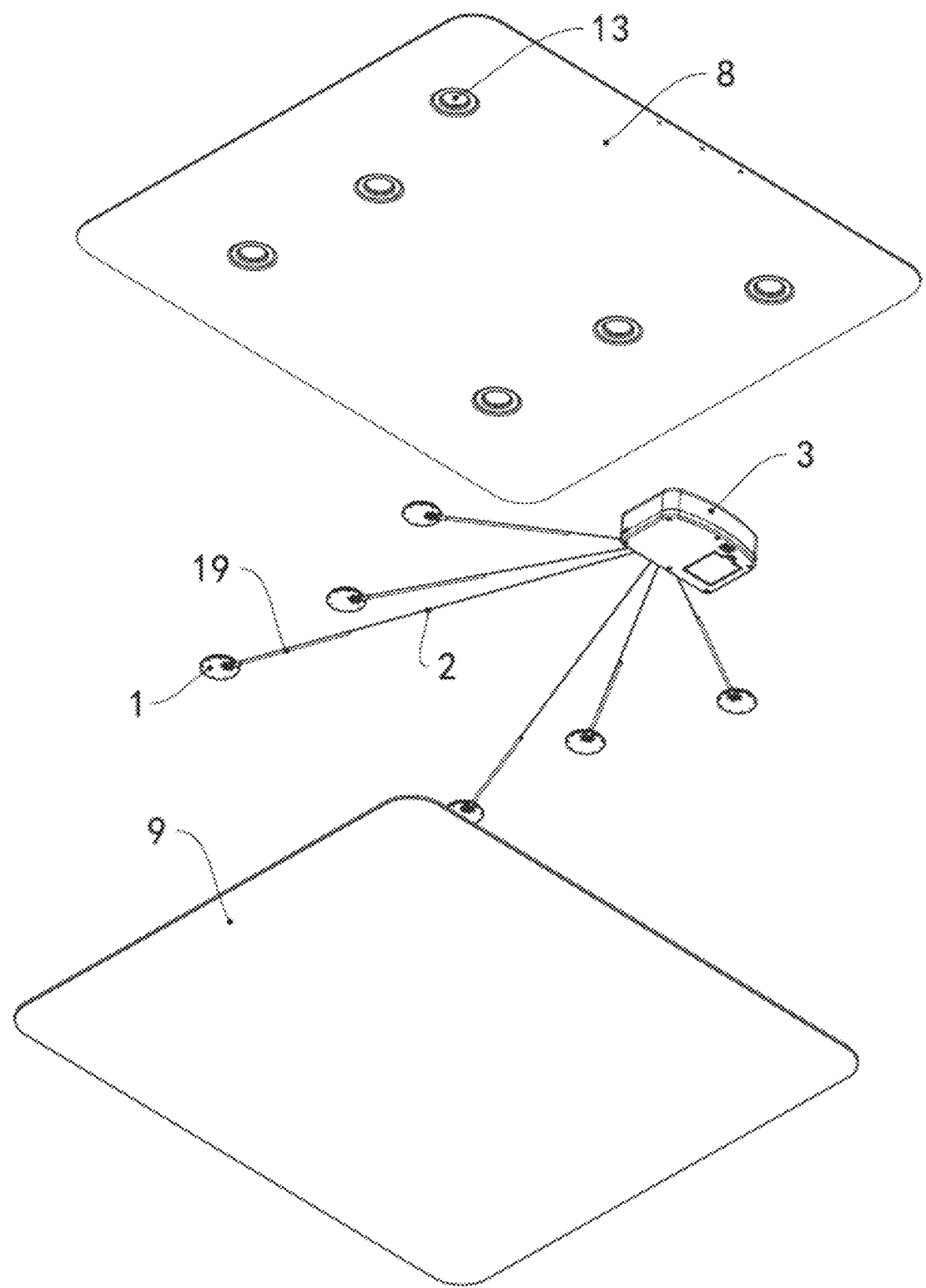
FIG. 5 is another three-dimensional exploded view of the pet toy in an embodiment of the present invention.
Figure 6:
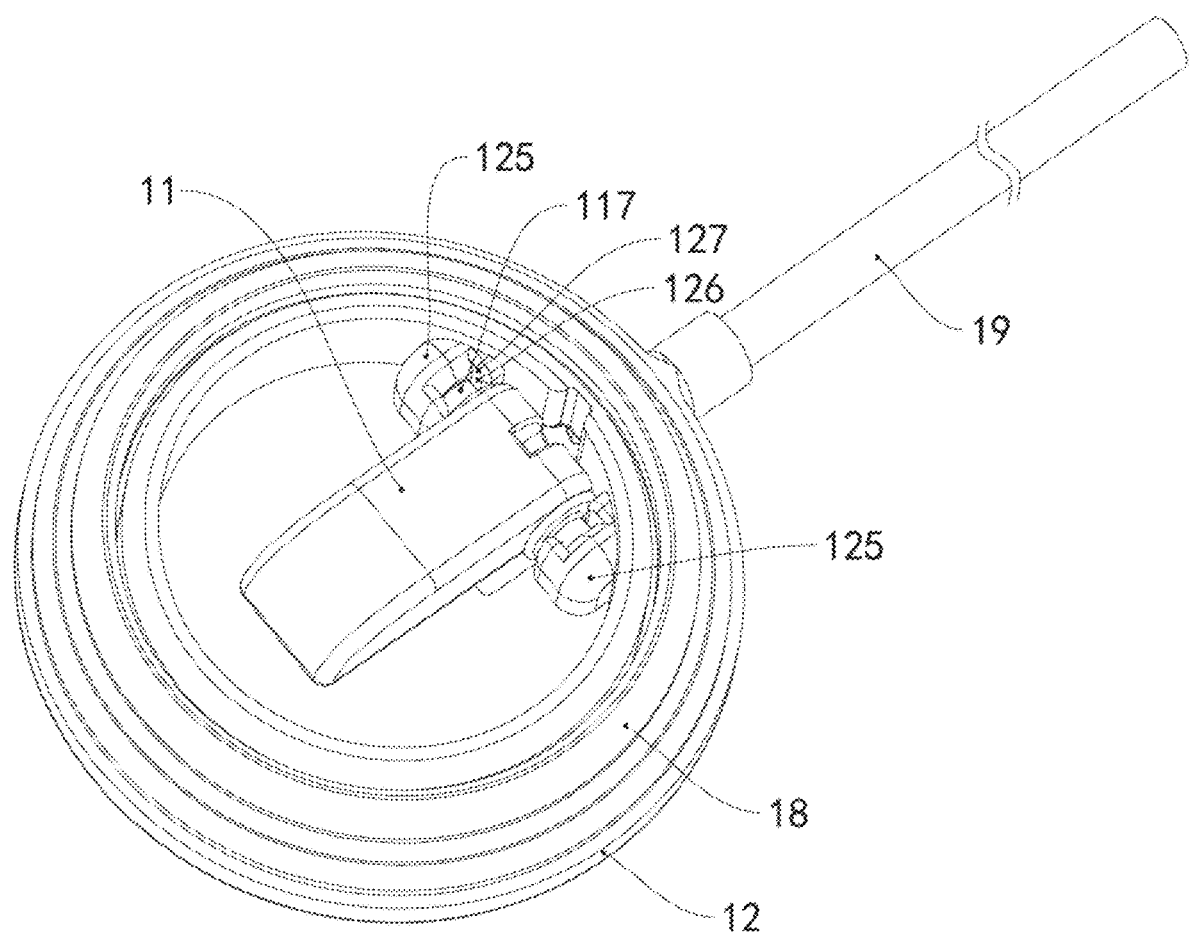
FIG. 6 is a three-dimensional schematic diagram of the jacking component 1 of an embodiment of the present invention; Reset structure 13 is not shown.
Figure 7:
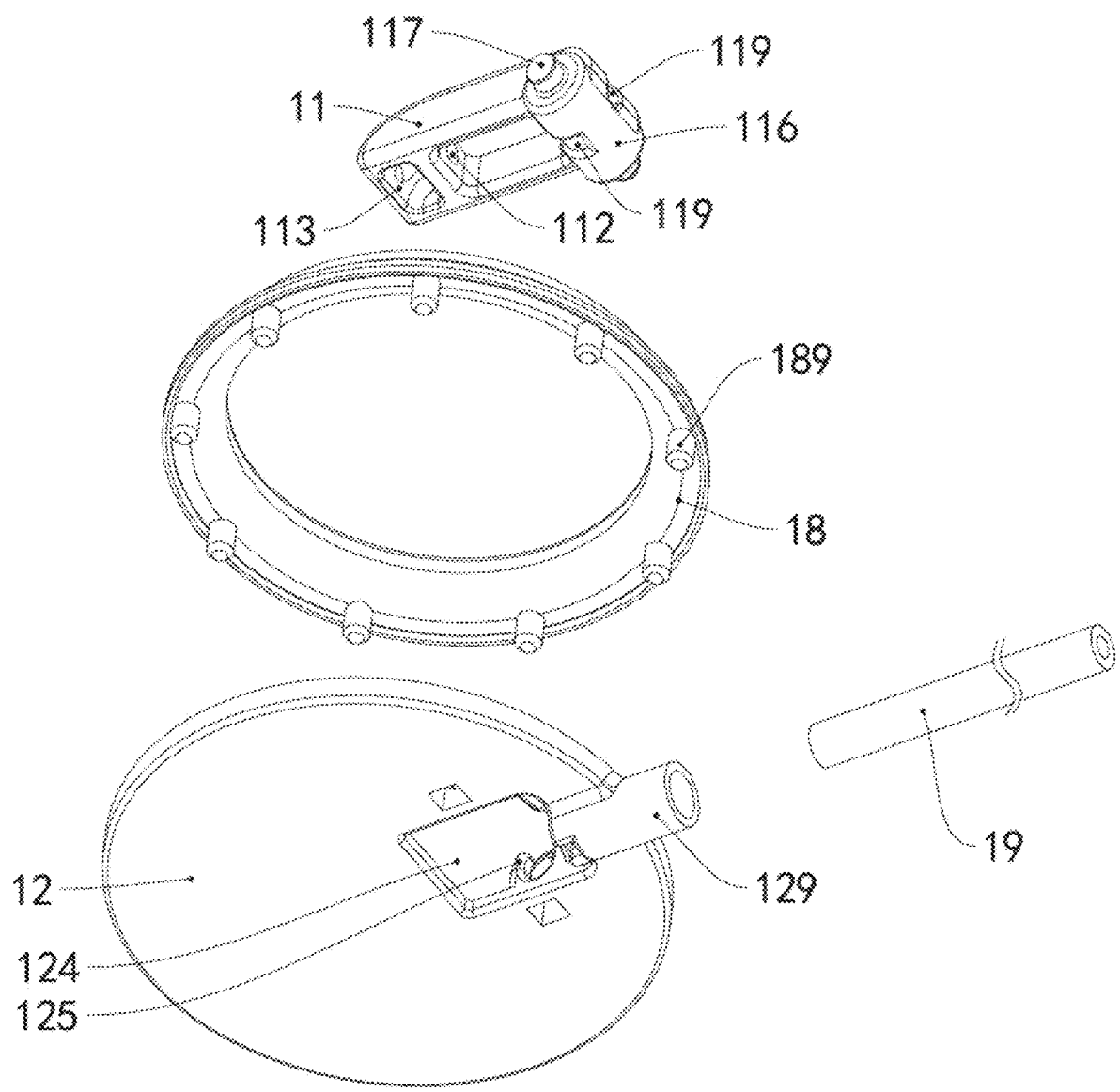
FIG. 7 is a three-dimensional exploded view of the jacking component 1 of an embodiment of the present invention.
Figure 8:
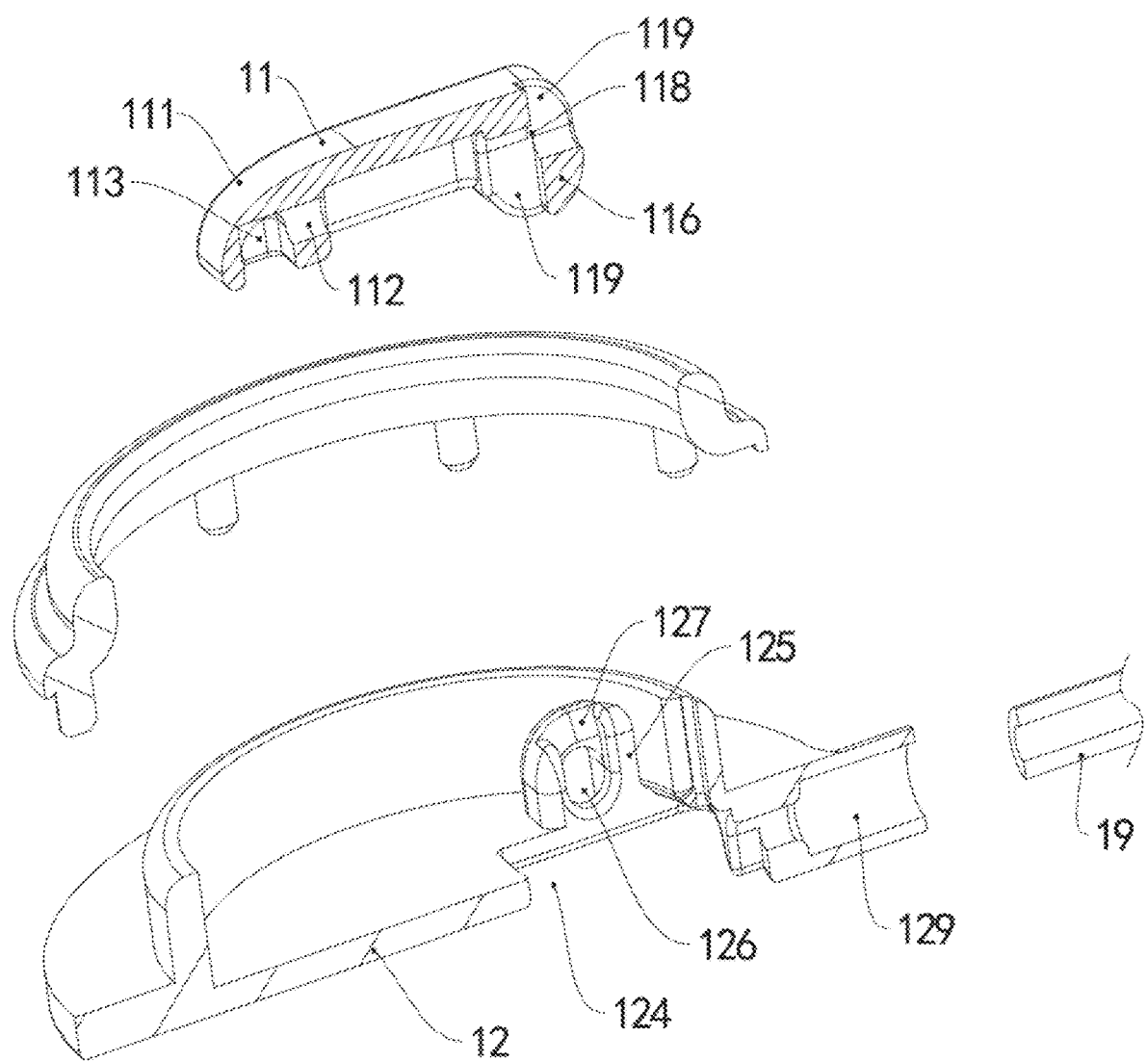
FIG. 8 is a three-dimensional exploded view of the jacking component 1 of an embodiment of the present invention.

As one of the specific embodiments, as shown in FIG. 3, the maximum distance between two jacking components 1 is the maximum distance among the jacking components 15, the maximum distance between two connecting wire ports 331 is the maximum distance among the connecting wire ports 335, and the maximum distance among the connecting wire ports 335 is less than the maximum distance among the jacking components 15. It can be easily understood that the connecting wires 2 between the connecting wire ports 331 and the jacking components 1 face the jacking components 1 because they are pressed against the outer wall of the connecting wire port 331, thereby allowing the power component 3 to be connected to part of the edge of the toy base pad 9 only, and further utilizing the toy base to a great extent.

As one of the specific embodiments, a rotatable steering wheel 333 fits over the steering body 332, and the connecting wires 2 bypass the steering wheel 333 respectively, thereby avoiding interference among the connecting wires and ensuring the smooth movement of the connecting wires.

As one of the specific embodiments, the rotating base 33 is fixedly provided with a protective body 334, which is used to prevent the connecting wires 2 from approaching the steering body 332, thereby ensuring that the connecting wires 2 move smoothly without being interfered with by one another.

Terms like "first" and "second" as used in the present invention are not intended to indicate any order, quantity or importance, but are used for differentiation only.

Terms like "one" and "one type" as used in the present invention are not intended to indicate any restriction in quantity, but indicate the existence of at least one subject mentioned.

Terms like "top", "bottom", "side", "longitudinal", "lateral", "middle", "center", "outer", "inner", "horizontal", "vertical", "left", "right", "above" and "below" indicating direction or position as used in the present invention are intended to reflect relative positions rather than absolute positions.

Terms like "rough", "overall", "approximate" and "similar" as used in the present invention are restrictive terms intended to indicate the existence of a feature but allow for a certain deviation. The degree of the allowable deviation can vary depending on the specific background; for example, for dimensional deviations, specific backgrounds depended on include but are not limited to national standards on dimensional tolerances.

What is claimed is:

1. A pet toy, comprising a jacking component, a power component, a toy base pad and a deformable connecting wire,
    wherein the jacking component comprises a reset structure, a rocker base and a rocker member hinged with the rocker base;
    the rocker member comprises a driven end, and there is a connecting wire actuating arm from the connecting wire to an axis of the hinged joint between the rocker member and the rocker base;
    the reset structure is connected to the rocker member and the rocker base, respectively, so that the driven end has a tendency of approaching the rocker base;
    the power component comprises a sliding end; two ends of the connecting wire are respectively a pulling end and a sliding end; the pulling end is connected to the driven end, and the sliding end is connected to the sliding member
    wherein the rocker member comprises a hinged end provided with a hinged shaft, the rocker base comprises a protrusion for hinging provided with a hinged groove, and the hinged shaft is inserted into the hinged groove.

2. The pet toy according to claim 1, wherein the rocker base is fixed to a front side of the toy base pad, and the power component is fixedly connected to the toy base pad.

3. The pet toy according to claim 2, wherein it further comprises a covering layer fixed to the front side of the toy base pad, where the connecting wire passes between the covering layer and the toy base pad.

4. The pet toy according to claim 3, wherein the reset structure is an elastic sheet fixedly connected to the rocker base, and is connected to the covering layer.

5. The pet toy according to claim 2, wherein the power component further comprises a rotating base and a rotating member provided with a bracing part;
    the rotating member is hinged with the rotating base and has rotational power, and the sliding member is slidably connected to the rotating base, which has a radial vector;
    when the rotating member rotates, the bracing part braces the sliding member and keeps the sliding member away from an axis of the rotating member.

6. The pet toy according to claim 5, wherein there are a plurality of jacking components, connecting wires and sliding members.

7. The pet toy according to claim 6, wherein the sliding members are linearly slidably connected to the rotating base; all linear sliding connections between the sliding members and the rotating base point to the axis of the rotating member.

8. The pet toy according to claim 5, wherein when viewed from above, the connecting wires and the rocker members of all jacking components pass through the axis of the rotating member.

9. The pet toy according to claim 8, wherein all jacking components and sliding members are distributed uniformly around the axis of the rotating member.

10. The pet toy according to claim 7, wherein the rotating base is provided with a plurality of connecting wire ports, which are located on one side of the rotating member, and the connecting wires pass through the connecting wire ports, respectively.

11. The pet toy according to claim 10, wherein a maximum distance between two jacking components is a maximum distance among the jacking components,
    a maximum distance between two connecting wire ports is a maximum distance among the connecting wire ports, and the maximum distance among the connecting wire ports is less than the maximum distance among the jacking components.

12. The pet toy according to claim 10, wherein the rotating base is provided with a steering body, and the connecting wires between the connecting wire ports and the corresponding steering body are parallel to one another.

13. The pet toy according to claim 12, wherein a rotatable steering wheel fits over the steering body, and the connecting wires bypass the steering wheel respectively.

14. The pet toy according to claim 12, wherein the rotating base is fixedly provided with a protective body, which is configured to prevent the connecting wires from approaching the steering body.

15. The pet toy according to claim 1, wherein the rocker member is located between the rocker base and the reset structure.

16. The pet toy according to claim 1, wherein the rocker base comprises a base sidewall, the rocker member is below or flush with the base sidewall when laid flat, and the reset structure is pressed against a top of the base sidewall.

17. The pet toy according to claim 1, wherein the rocker base is provided with a penetration port, and when viewed from above, there is an overlap between the hinged end and the penetration port, and the hinged groove is provided with an exposed port, and the hinged shaft can move upward and out of the exposed port.

* * * * *